United States Patent
Ahn

(10) Patent No.: US 11,104,207 B2
(45) Date of Patent: Aug. 31, 2021

(54) AIR DUCT SYSTEM FOR BATTERY OF VEHICLE AND CONTROLLING METHOD FOR AIR DUCT SYSTEM FOR BATTERY OF VEHICLE

(71) Applicants: HYUNDAI MOTOR COMPANY, Seoul (KR); KIA MOTORS CORPORATION, Seoul (KR)

(72) Inventor: Jin Han Ahn, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 691 days.

(21) Appl. No.: 15/820,922

(22) Filed: Nov. 22, 2017

(65) Prior Publication Data

US 2018/0290518 A1     Oct. 11, 2018

(30) Foreign Application Priority Data

Apr. 7, 2017   (KR) .................. 10-2017-0045344

(51) Int. Cl.
| | |
|---|---|
| *B60H 1/24* | (2006.01) |
| *B60H 1/26* | (2006.01) |
| *B60H 1/00* | (2006.01) |
| *H01M 10/625* | (2014.01) |
| *B60L 58/26* | (2019.01) |
| *H01M 10/613* | (2014.01) |
| *B60L 3/00* | (2019.01) |
| *B60L 50/64* | (2019.01) |
| *H01M 16/00* | (2006.01) |

(52) U.S. Cl.
CPC ........... *B60H 1/26* (2013.01); *B60H 1/00278* (2013.01); *B60H 1/00385* (2013.01); *B60H 1/00564* (2013.01); *B60L 3/0015* (2013.01); *B60L 3/0046* (2013.01); *B60L 50/64* (2019.02); *B60L 58/26* (2019.02); *H01M 10/613* (2015.04); *H01M 10/625* (2015.04); *B60L 2240/545* (2013.01); *H01M 16/00* (2013.01); *Y02T 10/70* (2013.01)

(58) Field of Classification Search
CPC .. B60H 1/26; B60H 1/00278; B60H 1/00385; Y02T 10/70
USPC ........................................................ 454/162
See application file for complete search history.

(56) References Cited

U.S. PATENT DOCUMENTS

| | | | | |
|---|---|---|---|---|
| 8,241,097 B2 * | 8/2012 | Zhu | ......................... | B60L 58/12 |
| | | | | 454/139 |
| 8,944,198 B2 * | 2/2015 | Miyazaki | ................ | B60L 58/26 |
| | | | | 180/68.5 |
| 9,410,629 B2 * | 8/2016 | Carlson | ................... | F16K 15/03 |
| 2014/0133071 A1 * | 5/2014 | Gingrich | ................ | H02B 1/565 |
| | | | | 361/678 |

FOREIGN PATENT DOCUMENTS

KR    10-2013-0101889 A    9/2013

* cited by examiner

*Primary Examiner* — Helena Kosanovic
(74) *Attorney, Agent, or Firm* — Morgan, Lewis & Bockius LLP

(57) ABSTRACT

Disclosed herein are an air duct system for a battery of a vehicle and a controlling method for an air duct system for a battery of a vehicle capable of protecting a vehicle passenger from toxic gases and flames introduced into the vehicle due to a fire of a battery by blocking a ventilation hole for cooling the battery when the fire occurs in the battery.

5 Claims, 6 Drawing Sheets

31(31a,31b)
41(41a,41b)

31(31a, 31b)
41(41a, 41b)

AIR DUCT SYSTEM FOR BATTERY OF VEHICLE AND CONTROLLING METHOD FOR AIR DUCT SYSTEM FOR BATTERY OF VEHICLE

CROSS REFERENCE TO RELATED APPLICATION

The present application is based on and claims the benefit of priority to Korean Patent Application No. 10-2017-0045344, filed on Apr. 7, 2017 the Korean Intellectual Property Office, the entire contents of which are incorporated herein for all purposes by this reference.

TECHNICAL FIELD

The present disclosure relates to an air duct system for a battery of a vehicle and a controlling method for an air duct system for a battery of a vehicle, and more particularly, to an air duct system for a battery of a vehicle and a controlling method for an air duct system for a battery of a vehicle capable of protecting a vehicle passenger from toxic gases and flames introduced into the vehicle due to a fire of the battery by blocking a ventilation hole for cooling the battery when a fire occurs in the battery.

BACKGROUND

Eco-friendly vehicles such as hybrid vehicles and electric vehicles are configured to include a high voltage battery that may store electric energy, an electric motor that is a power source, and an inverter for driving the electric motor.

The eco-friendly vehicle is configured to include an inlet duct that is designed to cool a battery cell by sucking indoor air through a separate blower for cooling the high voltage battery under intense heat conditions and then discharge the sucked indoor air to an outside of the battery.

However, the current inlet duct of the vehicle has an open structure at all times, and is positioned just below a passenger seat to introduce toxic gases and flames into the vehicle as they are when a fire occurs in the high voltage battery, thereby damaging passengers.

Therefore, there is a need for a solution to prevent toxic gases and flames from being introduced into a vehicle due to a fire when the fire occurs in a high voltage battery.

The matters described as the related art have been provided only for assisting in the understanding for the background of the present disclosure and should not be considered as corresponding to the related art known to those skilled in the art.

SUMMARY

An object of the present disclosure is to provide an air duct system for a battery of a vehicle and a controlling method for an air duct system for a battery of a vehicle capable of protecting a vehicle passenger from toxic gases and flames introduced into the vehicle due to a fire of the battery by blocking a ventilation hole for cooling the battery when a fire occurs in the battery.

According to an exemplary embodiment of the present disclosure, an air duct system for a battery of a vehicle includes: a base body having a ventilation hole communicating with a battery receiving space; a flap door disposed on the base body to selectively open or block the ventilation hole; and a cutoff switch configured to support the flap door so that the ventilation hole maintains an open state before an operation command is applied and release a support from the cutoff switch if the operation command is applied to allow the flap door to block the ventilation hole.

The air duct system may further include: a controller for applying an operation command to the cutoff switch when the cell temperature is equal to or higher than the reference temperature, the cell voltage is equal to or greater than the reference voltage, or the collision is detected when the fire occurs.

The air duct system may further include: an upper cover formed in a structure covering the base body.

The air duct system may further include: a collision detection switch located at a side or rear of the battery to detect a collision of the vehicle.

The air duct system may further include: a position switch forming between two ventilation holes formed in the base body to indicate whether the flap door is open.

According to another exemplary embodiment of the present disclosure, an air duct system for a battery of a vehicle includes: a base body having a ventilation hole communicating with a battery receiving space and a hinge part formed at one side of the ventilation hole; a flap door having one end thereof coupled to the hinge part; a spring configured to be provided on the hinge part to provide an elastic force so as to maintain a state where the flap door blocks the ventilation hole when no external force is applied; and a cutoff switch configured to allow the flap door to block the ventilation hole using an elastic force of a spring by supporting the flap door at another end of the flap door so as to keep the ventilation hole in an open state before an external impact is applied and releasing a support from the cutoff switch when the external impact is applied.

According to another exemplary embodiment of the present disclosure, a controlling method for an air duct system for a battery of a vehicle includes: determining whether operation conditions of a cutoff switch are satisfied; and operating the cutoff switch when the operation conditions of the cutoff switch are satisfied, in which operation conditions of the cutoff switch are cases where a cell temperature is equal to or higher than a reference temperature, a cell voltage is equal to or greater than the reference voltage, a collision is detected, or a fire is detected.

Among the operation conditions of the cutoff switch, in the case where the cell temperature is equal to or higher than the reference temperature, it may be determined whether the cell temperature stays at a predetermined temperature when it is determined that the cell temperature is equal to or higher than the reference temperature, and, if it is determined that the cell temperature does not stay at the predetermined temperature, it may again be determined whether the cell temperature is equal to or higher than the reference temperature after a predetermined time lapses.

Among the operation conditions of the cutoff switch, in the case where the cell voltage is equal to or greater than the reference voltage, it may be determined whether an inter-cell voltage deviation is equal to or greater than a reference voltage deviation after a predetermined time lapses when it is determined that the cell voltage is equal to or greater than the reference voltage.

Among the operation conditions of the cutoff switch, a case where a collision is detected may be the case where a collision switch that is in a turn on state is turned off due to a collision or an air bag signal is generated by the collision.

DETAILED DESCRIPTION

Hereinafter, an air duct system for a battery of a vehicle and a controlling method for an air duct system for a battery of a vehicle according to various exemplary embodiments of the present disclosure will be described with reference to the accompanying drawings.

Figure 1:
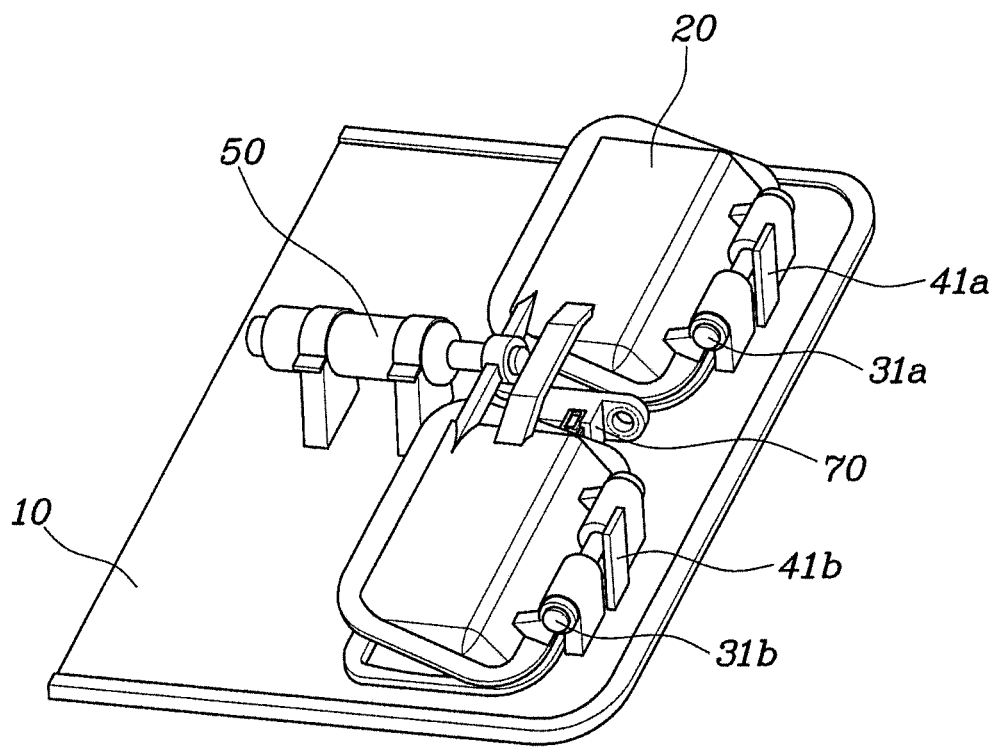
FIG. 1 is a configuration diagram of an air duct system for a battery of a vehicle when a flap door is in an open state according to an exemplary embodiment of the present disclosure.
Figure 2:
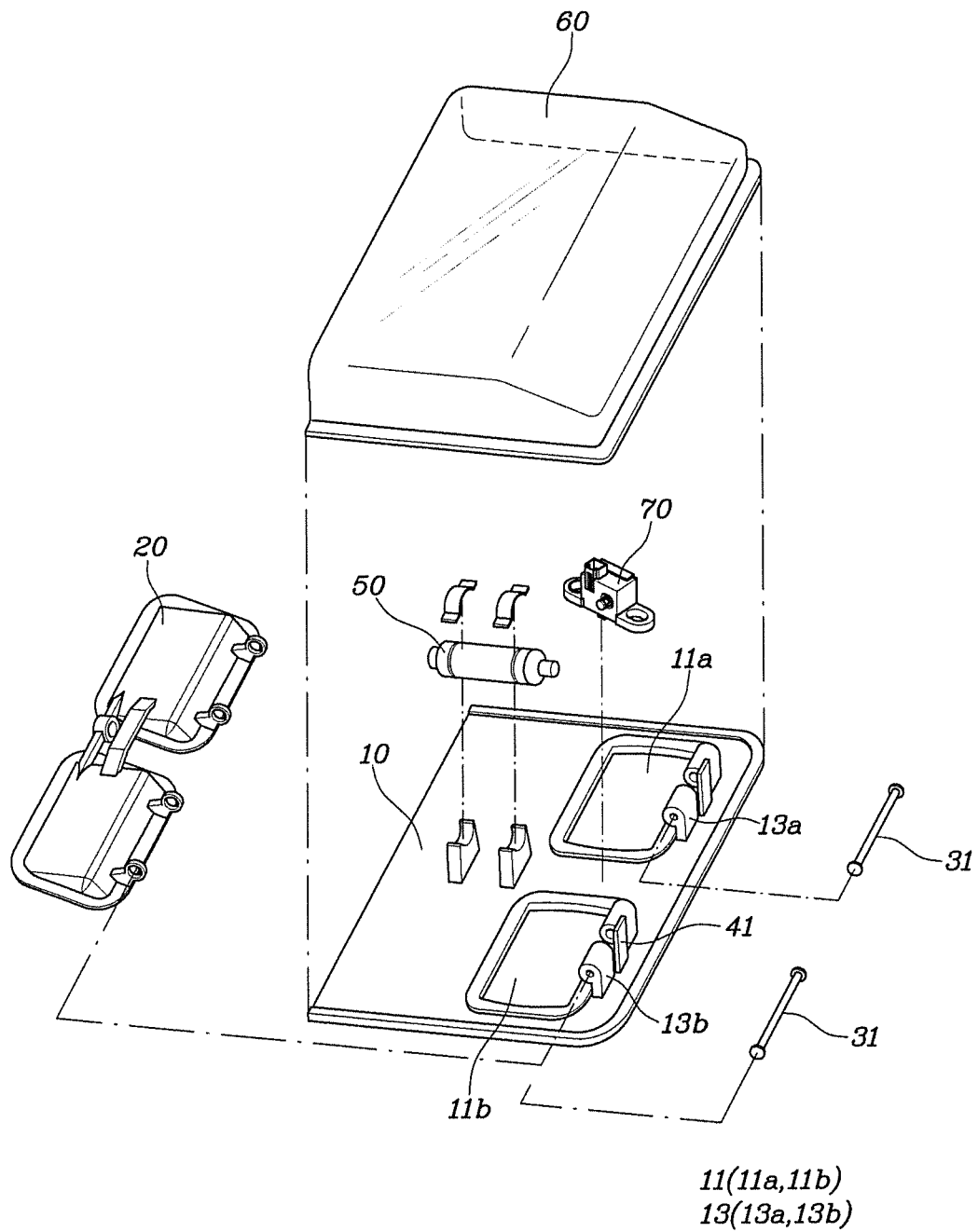
FIG. 2 is an exploded view of the air duct system for a battery of a vehicle in a blocked state according to an exemplary embodiment of the present disclosure.
Figure 3:
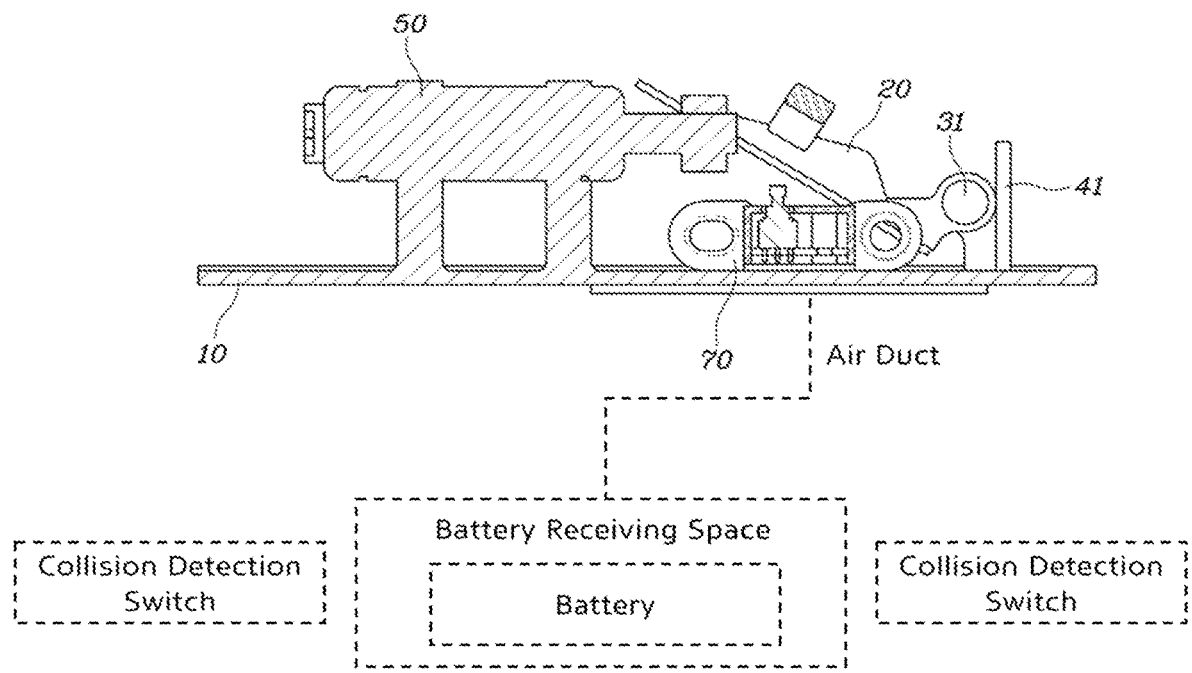
FIG. 3 is a side view of the air duct system for a battery of a vehicle in the blocked state according to an exemplary embodiment of the present disclosure.
Figure 4:
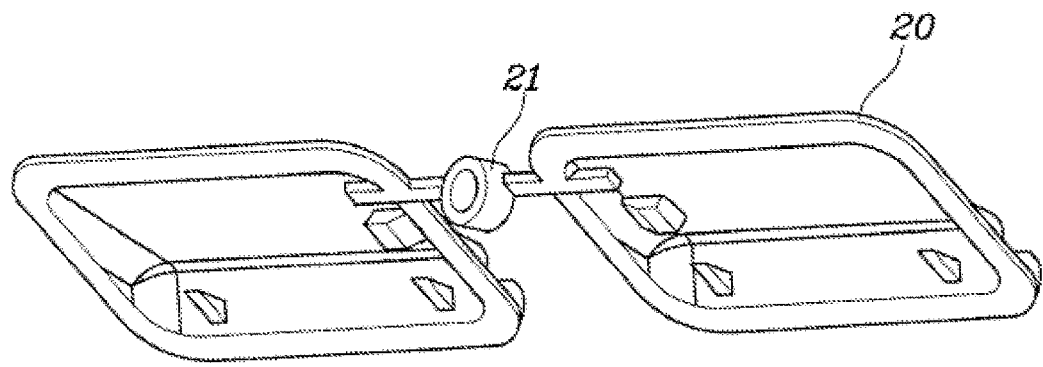
FIG. 4 is a view illustrating a flap door of the air duct system for a battery of a vehicle in the blocked state according to an exemplary embodiment of the present disclosure.
Figure 5:
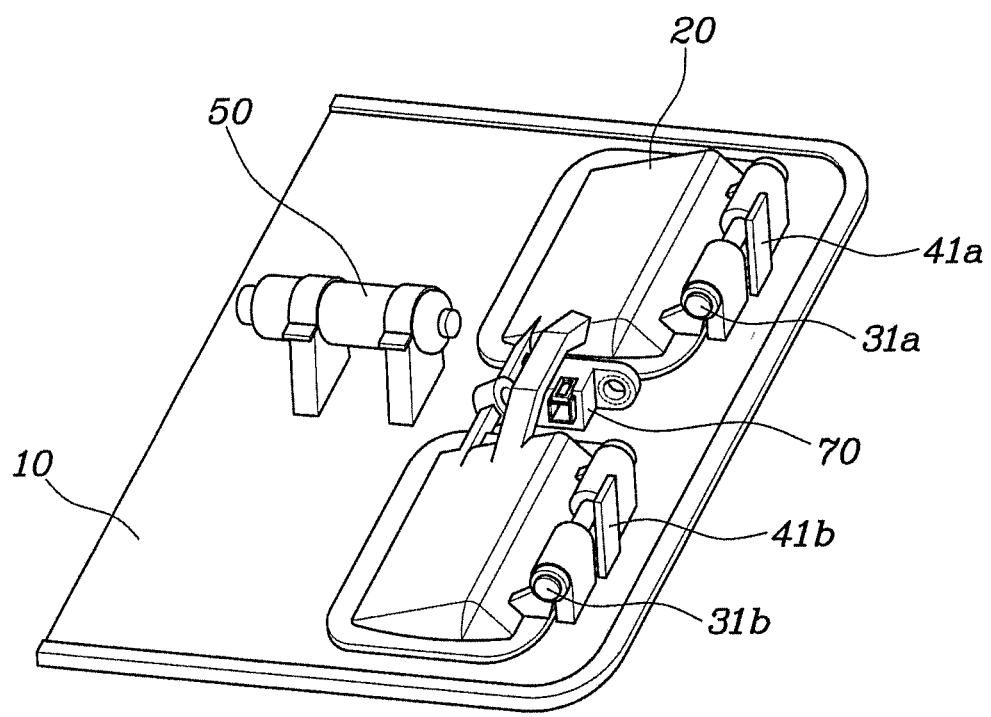
FIG. 5 is a configuration diagram of the air duct system for a battery of a vehicle when the flap door is in a blocked state according to an exemplary embodiment of the present disclosure.
Figure 6:
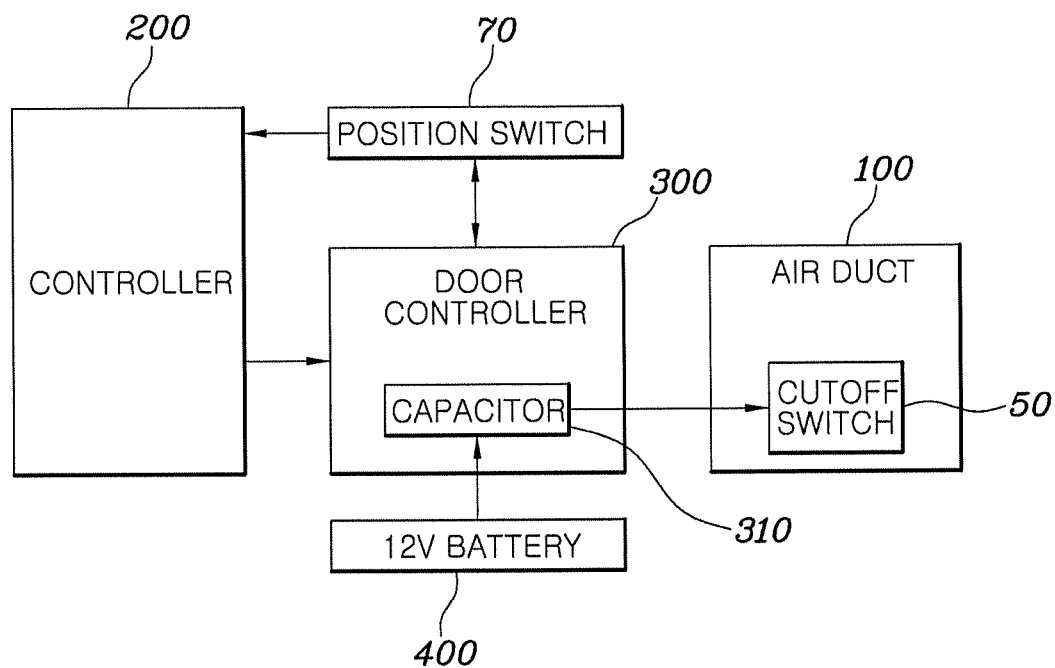
FIG. 6 is a configuration diagram for describing the air duct system for a battery of a vehicle in the blocked state according to an exemplary embodiment of the present disclosure.
Figure 7:
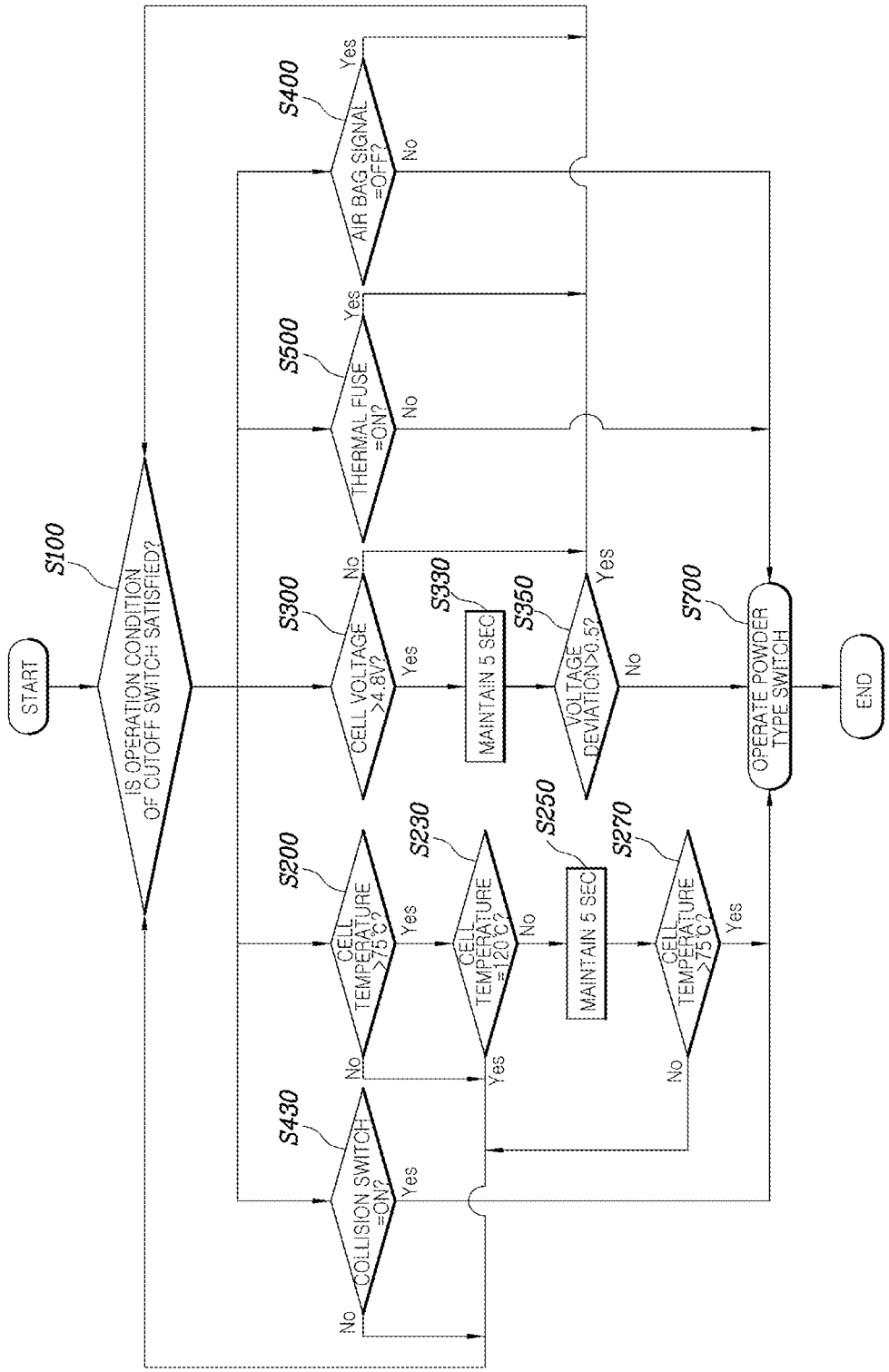
FIG. 7 is a flow chart of a controlling method for an air duct system for a battery of a vehicle in a blocked state according to an exemplary embodiment of the present disclosure.

FIG. 1 is a configuration diagram of an air duct system for a battery of a vehicle when a flap door is in an open state according to an exemplary embodiment of the present disclosure, FIG. 2 is an exploded view of the air duct system for a battery of a vehicle in a blocked state according to an exemplary embodiment of the present disclosure, and FIG. 3 is a side view of the air duct system for a battery of a vehicle in the blocked state according to an exemplary embodiment of the present disclosure. FIG. 4 is a view illustrating a flap door of the air duct system for a battery of a vehicle in the blocked state according to an exemplary embodiment of the present disclosure and FIG. 5 is a configuration diagram of the air duct system for a battery of a vehicle when the flap door is in a blocked state according to an exemplary embodiment of the present disclosure. FIG. 6 is a configuration diagram for describing the air duct system for a battery of a vehicle in the blocked state according to an exemplary embodiment of the present disclosure and FIG. 7 is a flow chart of a controlling method for an air duct system for a battery of a vehicle in a blocked state according to an exemplary embodiment of the present disclosure.

Referring first to FIGS. 1 and 2, an air duct system for a battery of a vehicle according to an exemplary embodiment of the present disclosure includes: a base body 10 configured to have a ventilation hole 11 (e.g., 11a and 11b) communicating with a battery receiving space (not shown); a flap door 20 configured to be installed on the base body 10 to selectively open or block the ventilation hole 11; and a cutoff switch 50 configured to support the flap door 20 so that the ventilation hole 11 maintains an open state before an operation command is applied and release a support state if the operation command is applied to allow the flap door 20 to block the ventilation hole 11.

In this configuration, the base body 10 has the ventilation hole 11 for cooling the battery. According to an exemplary embodiment of the present disclosure, the ventilation hole 11 may be formed in two. Further, the base body 10 may include a coupling part coupled to the flap door 20 and a support part supporting the cutoff switch 50.

The flap door 20 may block the ventilation hole of the base body 10 by an elastic force of a spring 41 (e.g., 41a and 41b) when one end of the flap door 20 is not applied with an external force by coupling one end of the ventilation hole 11 of the base body 10 to a hinge 31 (e.g., 31a and 31b) and the spring 41. Further, a ventilation hole blocking part of the flap door 20 which blocks the ventilation hole 11 of the base body 10 may have a size enough to seal the ventilation hole 11 when the ventilation hole 11 is blocked.

According to an exemplary embodiment of the present disclosure, the air duct system for a battery of a vehicle may include an upper cover 60 configured to be formed in a structure covering the base body 10.

The cutoff switch 50 is supported by the support part of the cutoff switch 50 of the base body 10 and may be coupled to the support part of the base body 10 by a fixing clip or the like.

The cutoff switch 50 may be a powder type switch as an example of the present disclosure. Further, an inner piston of the switch may be fixed in an advanced state before the cutoff switch 50 is operated, and the piston may be in a backward state by an explosion of an internal gunpowder during the cutoff switch 50 is operated.

The cutoff switch 50 may be operated even under the power-off conditions due to the breakage of the auxiliary battery or the like by using the powder type switch.

Referring to FIG. 3, the inner piston of the cutoff switch 50 may support the flap door 20 so that the flap door 20 is not blocked by an elastic force of the spring 41 before the cutoff switch 50 is operated. Referring to FIG. 4, the flap door 20 may be coupled to the piston in the advanced state before the operation of the cutoff switch 50 to form a groove 21 that may maintain an open state. The flap door 20 has a bucket shape, which is to secure a cross-sectional area of a cooling passage in the open state for cooling the battery as much as possible.

Referring to FIG. 5, when the cutoff switch 50 is operated, the piston moves backward from the advanced state by the explosion of the internal gunpowder, such that the flap door 20 which is coupled by the piston of the cutoff switch 50 blocks the ventilation hole 11 of the base body 10 by the elastic force of the springs 41a and 41b.

According to an exemplary embodiment of the present disclosure, the air duct system for a battery of a vehicle may further include a collision detection switch (not shown) to be located at a side or rear of the battery and configured to detect a collision of the vehicle.

Here, the collision detection switch may be operated by a collision deformation, and may remain in an on state before the operation, and may be in an off state in the event of the operation due to the collision.

According to an exemplary embodiment of the present disclosure, the air duct system for a battery of a vehicle may further include a position switch 70 configured to be attached between two ventilation holes 11a and 11b of the base body 10.

Here, when the flap door 20 is blocked, the position switch 70 is turned off, and when the flap door 20 is in the open state, the position switch 70 is kept in the turn on state. By doing so, the position switch 70 always monitors the open state of the flap door 20 and the position switch 70 transmits a dangerous message to a DTC code and a cluster when the flap door 20 is blocked by the operation of the cutoff switch 50.

According to an exemplary embodiment of the present disclosure, the air duct system for a battery of a vehicle may further include a controller 200 configured to apply an operation command to the cutoff switch 50 when the cell temperature is equal to or higher than the reference temperature, the cell voltage is equal to or greater than the reference voltage, or the collision is detected when a fire occurs.

Here, according to an exemplary embodiment of the present disclosure, the reference temperature may be 70° C. and the cell voltage may be 4.8V. According to the exemplary embodiment of the present disclosure, the case where a collision is detected may be the case where the collision detection switch is turned off by a collision or an airbag deployment signal is generated by the collision. In addition, according to an exemplary embodiment of the present disclosure, the case where a fire occurs may be the case where the thermal fuse is turned off due to a fire occurring in the battery.

Referring to FIG. 6, according to an exemplary embodiment of the present disclosure, the air duct system for a battery of a vehicle may further include a flap door controller 300. The flap door controller 300 may operate the cutoff switch 50 when receiving an operation command from the controller 200.

The controller 200 or the flap door controller 300 is an electric circuitry that executes instructions of software which thereby performs various functions described hereinafter.

The inside of the flap door controller 300 may be provided with a capacitor 310. As a result, the flap door 20 may be blocked even under power off conditions due to a breakage of a 12V auxiliary battery 400 or the like. Referring to FIG. 2, the air duct system for a battery of a vehicle according to an exemplary embodiment of the present disclosure includes a base body 10 configured to have a ventilation hole 11 communicating with a battery receiving space and a hinge part 13 formed at one side of the ventilation hole 11; a flap door 20 configured to have the hinge part 13 coupled to one end thereof; a spring 41 configured to be provided on the hinge part 13 to provide an elastic force so as to maintain the state where the flap door 20 blocks the ventilation hole 11 when no external force is applied; and a cutoff switch 50 configured to allow the flap door 20 to block the ventilation hole 11 using the elastic force of the spring 41 by supporting the flap door 20 at the other end of the flap door 20 so as to keep the ventilation hole 11 in the open state before the external impact is applied and releasing the support state when the external impact is applied.

Here, the hinge part 13 of the base body 10 may be coupled to the hinge 31 and the spring 41.

Referring to FIG. 7, The controlling method for an air duct system for a battery of a vehicle according to an exemplary embodiment of the present disclosure includes determining whether the operation conditions of the cutoff switch are satisfied (S100); and operating the cutoff switch when the operation conditions of the cutoff switch are satisfied (S700). Here, the operation conditions of the cutoff switch may be the case where the cell temperature is equal to or higher than the reference temperature (S200), the cell voltage is equal to or greater than the reference voltage (S300), a collision is detected (S400, S430), or a fire is detected (S500).

In the determining whether the operation conditions of the cutoff switch are satisfied (S100), among the operation conditions of the cutoff switch, in the case where the cell temperature is equal to or higher than the reference temperature, it may be determined whether the cell temperature is a predetermined temperature when the cell temperature is equal to or higher than the reference temperature and it may again be determined whether the cell temperature is equal to or higher than the reference temperature after a predetermined time lapses when the cell temperature is not the predetermined temperature (S200, S230, S250, S270).

Here, the reference temperature may be 75° C. as described above, and according to an exemplary embodiment of the present disclosure, the predetermined temperature may be 120° C., and the predetermined time may be 5 seconds. The reason for determining whether the cell temperature is 120° C. after it is determined whether the cell temperature is equal to or higher than 75° C. is to prevent the malfunction of the cutoff switch due to the overtemperature because the temperature of 120° C. is measured when the battery cell is disconnected.

In the determining whether the operation conditions of the cutoff switch are satisfied (S100), among the operation conditions of the cutoff switch, when the cell voltage is equal to or greater than the reference voltage, it may be determined whether the inter-cell voltage deviation is equal to or greater than the reference voltage deviation after the predetermined time lapses (S300, S330, S350).

Here, the reference voltage may be 4.8V as described above and according to an exemplary embodiment of the present disclosure, the predetermined time may be 5 seconds and the reference voltage deviation may be 0.5V. The reason of determining the inter-cell voltage deviation is to prevent the malfunction of the cutoff switch due to the defect of the sensing line when the inter-cell voltage deviation is equal to or greater than the reference voltage deviation.

In the determining whether the operation conditions of the cutoff switch are satisfied (S100), among the operation conditions of the cutoff switch, the case where a collision is detected may be the case where the collision switch that is in the turn on state is turned off due to a collision or the air bag signal is generated by a collision (S400, SS430).

As described above, the air duct system for a battery of a vehicle and the controlling method for an air duct system for a battery of a vehicle according to various exemplary embodiments of the present disclosure may protect vehicle passengers from toxic gases and flames introduced into the vehicle due to the fire of the battery.

Further, it is possible to overcome the layout restrictions on the current vehicle. That is, it may be installed inside the current duct.

Further, the cut off switch may be operated even under the power-off conditions due to the breakage of the auxiliary battery or the like by using the powder type switch.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. An air duct system for a battery of a vehicle, comprising:
   a base body having a ventilation hole communicating with a battery receiving space;
   a flap door having a groove and disposed on the base body to selectively open or block the ventilation hole;
   a cutoff switch having an inner piston and configured to support the flap door so that the ventilation hole maintains an open state before an operation command is applied and release a support from the cutoff switch if the operation command is applied to allow the flap door to block the ventilation hole; and a controller for applying an operation command to the cutoff switch when a cell temperature is equal to or higher than a reference temperature, a cell voltage is equal to or greater than a reference voltage, a collision is detected, or a fire is detected, wherein the groove of the flap door is coupled to the inner piston to maintain the open state, and wherein the cutoff switch is a powder type switch and is supported by a support part of the base body.

2. The air duct system of claim 1, further comprising:
an upper cover formed in a structure covering the base body.

3. The air duct system of claim 1, further comprising:
a collision detection switch located at a side or rear of the battery to detect a collision of the vehicle.

4. The air duct system of claim 1, further comprising:
a position switch formed between two ventilation holes formed in the base body to indicate whether the flap door is open.

5. An air duct system for a battery of a vehicle, comprising:

a base body having a ventilation hole communicating with a battery receiving space and a hinge part formed at one side of the ventilation hole;

a flap door having one end thereof coupled to the hinge part and a groove;

a spring configured to provide an elastic force to the hinge part so as to maintain a state where the flap door blocks the ventilation hole when no external force is applied;

a cutoff switch having an inner piston and configured to support the flap door at another end of the flap door so as to keep the ventilation hole in an open state before an external impact is applied, and to release a support from the cutoff switch to allow the flap door to block the ventilation hole using the elastic force of the spring when the external impact is applied; and a controller for applying an operation command to the cutoff switch when a cell temperature is equal to or higher than a reference temperature, a cell voltage is equal to or greater than a reference voltage, a collision is detected, or a fire is detected, wherein the groove of the flap door is coupled to the inner piston to maintain the open state, and wherein the cutoff switch is a powder type switch and is supported by a support part of the base body.

\* \* \* \* \*